April 3, 1951 G. P. WENNEMER 2,547,549

RINGING EQUIPMENT FOR PULSE MODULATION SYSTEMS

Filed Oct. 2, 1947 2 Sheets-Sheet 1

INVENTOR
G. P. WENNEMER
BY George C. Lord
ATTORNEY

April 3, 1951 G. P. WENNEMER 2,547,549

RINGING EQUIPMENT FOR PULSE MODULATION SYSTEMS

Filed Oct. 2, 1947 2 Sheets-Sheet 2

INVENTOR
G. P. WENNEMER
BY George C. Lord
ATTORNEY

Patented Apr. 3, 1951

2,547,549

UNITED STATES PATENT OFFICE 2,547,549

RINGING EQUIPMENT FOR PULSE MODULATION SYSTEMS

Gerard P. Wennemer, Fairmount, N. J., assignor to Bell Telephone Laboratories, Incorporated, New York, N. Y., a corporation of New York Application October 2, 1947, Serial No. 777,455

5 Claims. (Cl. 179—15)

This invention relates to ringing equipment for time division multiplex, pulse modulation systems.

Systems of the type contemplated herein employ pulse position modulation and include means at a transmitting station for producing a plurality of interlaced series of pulses, one series being provided for each message channel. The message signals in each channel are employed to vary or modulate the relative time positions of the pulses of one series and the modulated pulses are transmitted. At the receiving station means are provided for recovering the message signals from the time-modulated pulses of each series. In such systems it is necessary to provide some means for sending supervisory signals such as ringing signals between stations whereby an operator at the receiving station may be notified when a message is to be transmitted and given information as to which channel or channels will be used for the transmission.

Heretofore, ringing signals have been transmitted over pulse position modulation radio systems by eliminating at the transmitter, the channel pulses corresponding to the signal channels for which ringing is desired. In such systems means have been provided at the receiver for actuating the ringer whenever the pulses of a channel are absent in the transmitted signal. This method of ringing is not completely satisfactory when employed in a multi-channel system wherein the radio link between the transmitting and receiving station includes certain types of velocity variation tubes as the transmitting oscillator. It is a characteristic of such velocity variation tubes that their operating frequency may be varied materially by changes in the duty cycle of the modulating signal applied thereto. Consequently, the removal of a channel pulse in the multiplex signal applied to the radio transmitter causes a change in the operating frequency of the oscillator and if ringing is desired simultaneously in several channels, the change in the duty cycle caused by the elimination of the channel pulses for a plurality of channels is sufficiently great to produce large changes in the operating frequency of the transmitting oscillator. If, for example, ringing is effected simultaneously over several of the channels of an 8-channel system employing a radio frequency of 5,000 megacycles, frequency changes of the order of 25 megacycles may be produced. As a result, the radio receiver must have a wide range automatic frequency control if the transmitted signals are to be received. Such a receiver is susceptible to extraneous noise and unwanted signals.

It is the object of the present invention to provide ringing equipment for time division multiplex, pulse modulation systems, such that no changes in the duty cycle of the radio transmitter will be produced by the ringing operation.

In accordance with the invention ringing is accomplished by shifting the positions of the pulses of the channel in which ringing is desired to such an extent that the normal range of modulation produced by message signals is exceeded. At the receiver, means are provided for operating a ringer whenever the channel pulses of a particular channel fall beyond the range of positions reserved for message signal modulation. The above and other features of the invention will be described in detail in the following specification taken in connection with the drawings in which.

Figure 1B:
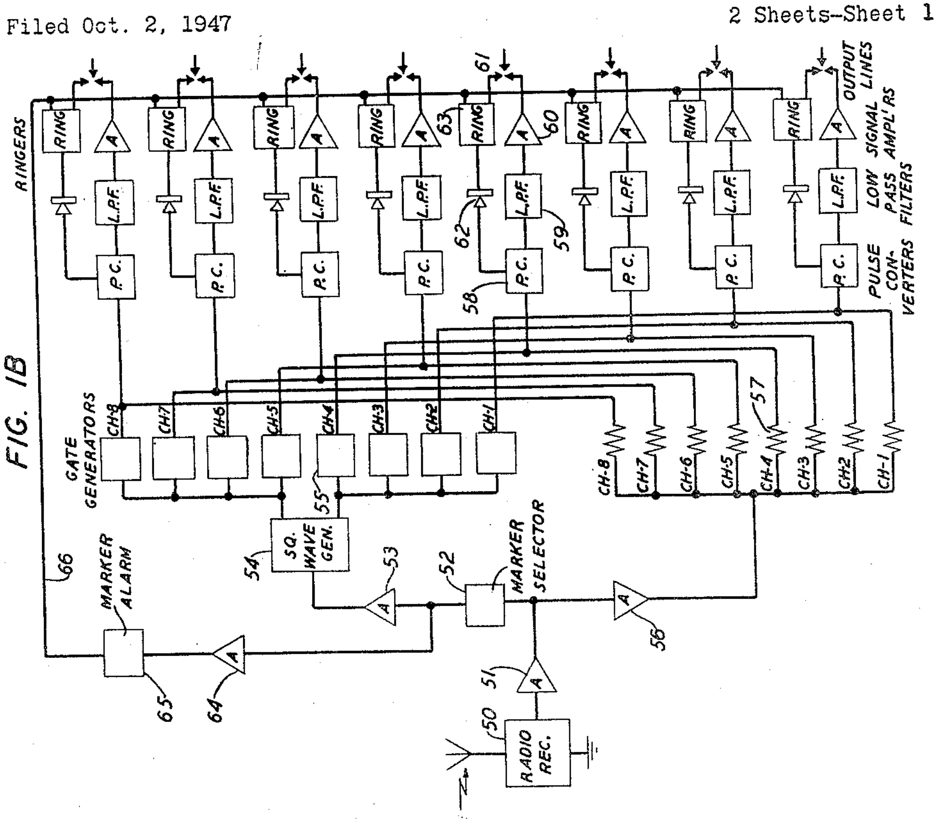
Figs. 1A and 1B are block diagrams of the transmitting and receiving portions respectively of a time division multiplex, pulse position modulation system with ringing equipment according to the invention.

A brief description of a time division multiplex pulse position modulation system will be helpful in showing the interrelation between certain of the message circuits and the ringing equipment. A typical system is shown in block form in Figs. 1A and 1B. In this system interlaced series of pulses are modulated in their times of occurrence or time phases in accordance with the message signals to be transmitted over each channel. In Fig. 1A, eight input message channels identified as CH-1 through CH-8 are shown. The channels are similar and channel No. 4 will be taken as representative for purposes of description. In this channel either the incoming message signals or ringing signals, which may for example be a 20-cycle alternating current, are applied to an input network 10 which serves both to separate the message signals from the low frequency ringing signals and to limit the range of frequencies in the message signal to the range acceptable by the modulating equipment. The message signals are applied through an amplifier 11 to a pulse modulator 12, while the ringing signals are applied over a separate path directly to the pulse modulator.

The eight pulse modulators receive short impulses at fixed times during the multiplex period and in response to these impulses produce length-modulated pulses which are timed normally to end at the center or mid-point of the channel period assigned to the particular pulse modulator. The time-modulated pulses so produced are varied in length by the message signal currents applied to the modulators from the input channels. The endings of the length-modulated pulses from the pulse modulators are employed to energize pulse generating devices to produce pulses, the time positions of which depend upon the length of the pulses received from the pulse modulators. These time-modulated pulses are applied to a radio transmitter and employed to control the radiation of corresponding pulses of ultra-high frequency energy.

The pulse modulators are energized by pulses derived from a master oscillator 13, the output of which is differentiated to obtain a series of positive and negative pulses. Since it is desired to energize the eight pulse modulators serially during one multiplex period, the output of the master oscillator 13 is applied to differentiating circuits 14, 14' and 17 to obtain positive and negative pulses which are 180 degrees out of phase. Thus, by choosing the proper differentiated pulses and reversing their polarity as required by means of exciters 15 and 15', the operation of the several modulators may be controlled by the oscillator 13. Since a slight interval or guard time must be allowed between the channel signals to permit separation of the channel pulses at the receiver, the maximum range of position modulation is made slightly less than the channel period allotted to each channel.

The length-modulated output pulses from the pulse modulators of odd-numbered channels are applied to a pulse generator 18' while those for the even-numbered channels are applied to a similar pulse generator 18 and the position modulated pulses produced by these pulse generators are applied to a radio transmitter 19. Oscillator 13 is also employed to operate a marker generator to produce a marker pulse timed to precede the position-modulated pulses from pulse formers 18 and 18'.

Ringing signals which are separated from message signals by the input networks in each channel, are applied directly to the pulse modulators wherein they are employed to vary the length of the length-modulated pulses produced by the associated pulse modulators to an extent beyond the variation produced by the maximum amplitude message signal. The channel pulses produced by the pulse generators under such conditions fall within the guard time between adjacent channels. The input signal to the transmitter thus includes a pulse for each channel irrespective of whether a ringing signal is present in any channel and the duty cycle of the transmitting oscillator remains the same.

Figure 1A:
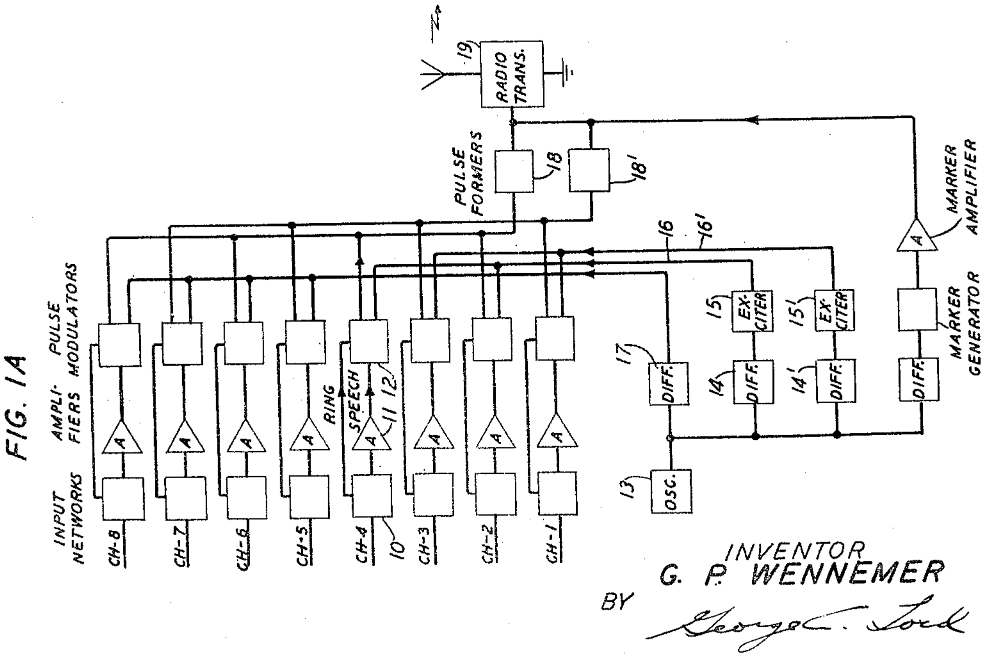

The receiving equipment of the system is shown in Fig. 1B. Here the radio frequency pulses are rectified in radio receiver 50 and applied through amplifier 51 to two different paths. In one path the signals are applied through amplifier 56 to input circuits corresponding to the eight message channels. In each of these channels and, for example, in channel 4 the radio frequency signals for all channels are applied through high resistances such as resistor 57 to the input of a pulse converter, such as pulse converter 58. In the other branch the received and rectified radio signals are applied to a marker selector 52 which separates the marker pulses from the remainder of the signal and applies the marker pulses to a square wave generator 54. This square wave generator is employed to control eight gate generators, one for each channel, which are arranged to produce gate pulses coincident and coextensive with the portion of each of the channel periods corresponding to the maximum range of position modulation. Considering the fourth channel, the output of the square wave generator 54 is supplied to a gate generator 55, the output of which is applied to pulse converter 58.

Pulse converter 58 is responsive only when the time position-modulated channel pulses and the gate pulses are present at the same time and is arranged to produce a pulse the length of which is dependent upon the time position of the channel pulse applied through resistor 57. These length-modulated pulses are passed through a low-pass filter 59 to recover the message signal which enters amplifier 60, the output of which is applied to switching equipment shown diagrammatically at 61.

The output signals from the pulse converter are also applied through a rectifier 62 to ringing equipment 63. The rectified currents applied to the ringing equipment are employed to maintain the ringing circuit disabled so long as both gate and channel pulses are applied simultaneously to the pulse converter. Upon failure of a channel pulse to reach the pulse converter simultaneously with a gate pulse the rectified current falls to such a value that the ringing circuit is actuated. Since the application of a ringing signal to any channel at the transmitter causes the channel pulses for that channel to occur in the guard time between adjacent channels, and thus at times outside the range to which the gate pulses correspond, a drop in the rectified current will occur and the ringing circuit for the corresponding channel at the receiver will operate.

Also shown in Fig. 1B is a marker alarm circuit actuated by the output of marker selector 52 and comprising an amplifier 64 and alarm 65. Upon failure of the marker pulses the marker alarm which is normally disabled by the output of amplifier 64 is operated and in addition a signal is applied over lead 66 to each of the ringing equipments, such as 63 of channel 4 to disable the ringing equipment thus to prevent ringing on all channels in the event of failure of the marker pulses.

A more complete description of this typical system may be found at page 82 of Electronic Industries for December 1945, vol. 4, No. 12 or in the application of J. O. Edson, Serial No. 559,354, filed October 19, 1944, entitled "Multiplex Telephony."

Figures 2, 3:
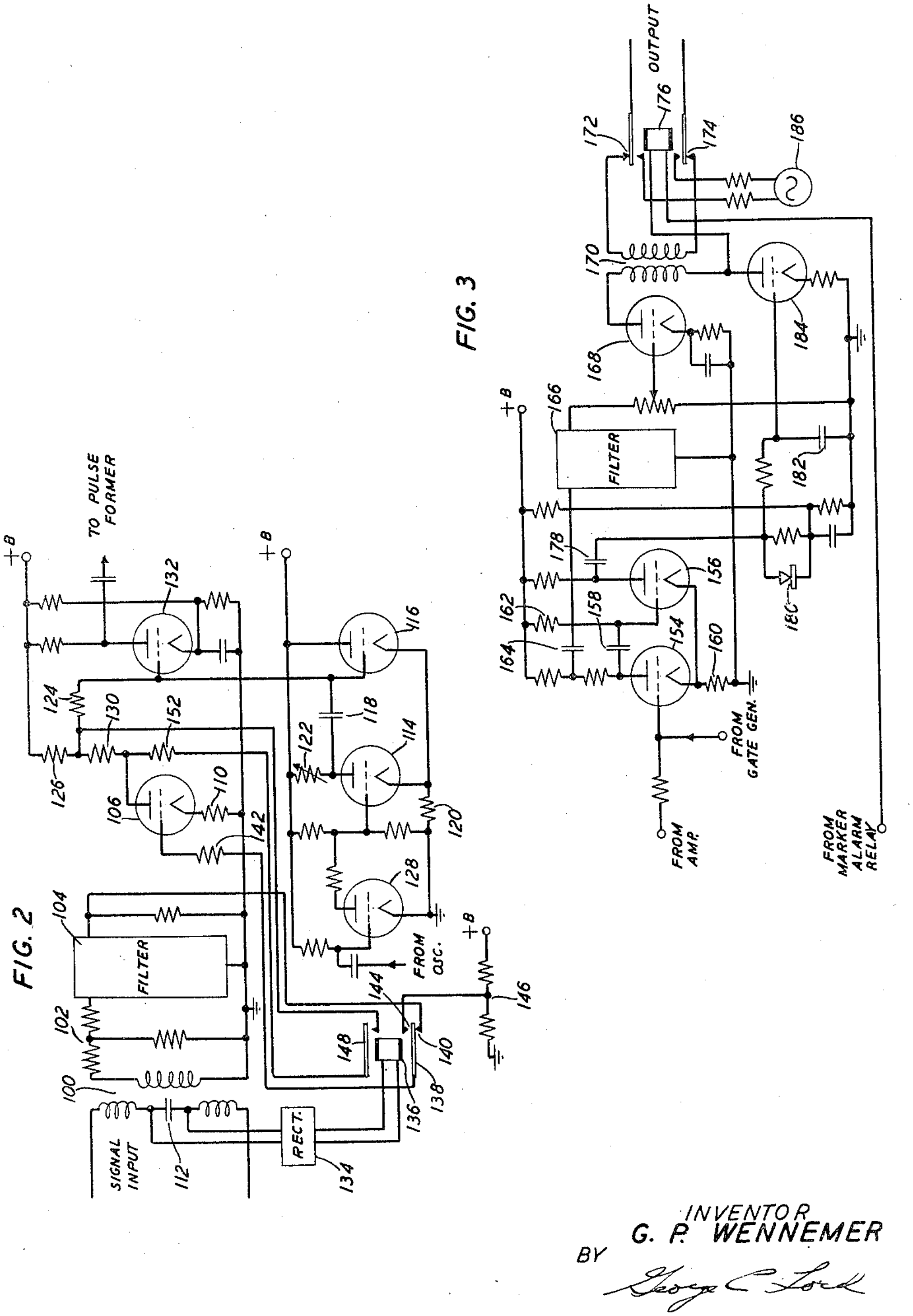
Fig. 2 is a schematic diagram of a portion of the transmitting equipment of Fig. 1A showing in detail the ringing equipment for a single channel.
Fig. 3 is a schematic diagram showing the ringing equipment required at the receiving station for a single channel of the receiving equipment of Fig. 1B.

Details of the ringing equipment for the transmitting and receiving stations of the system of Figs. 1A and 1B are shown in Figs. 2 and 3, respectively, each of which represents appropriate portions of a single message channel. Referring to Fig. 2, the signal input for the channel which may comprise either a message signal or a low frequency ringing signal is applied to an input transformer 100 in which signal and ringing currents are separated. The signal current output path includes the secondary winding of transformer 100, a level adjusting pad 102 and a low-pass filter 104 which limits the frequency range of message signals to a band acceptable by the modulator. The output of filter 104 is applied to the control grid of a message signal amplifier 106, which may conveniently comprise a triode-type tube, through contact 140 of relay 136 to be described below. The amplitude of the signal output from the amplifier is limited by series resistor 142 in the grid circuit in one direction and the cathode resistor 110 in the other. The maximum output signal is thus limited to correspond to the maximum range acceptable by the modulator to which it is applied.

The pulse position modulator comprises triode tubes 114 and 116 connected in a relaxation circuit of a type sometimes known as one shot or single-trip multivibrator. The plate of tube 114 is connected through capacitor 118 to the control grid of tube 116 to furnish the intertube connection in one direction while the cathodes of the two tubes are connected together and through a common cathode resistor 120 to ground to furnish the intertube connection in the other direction. The values of the coupling circuit components including capacitor 118, variable resistor 122 connected in the plate circuit of tube 114, bias resistors 124 and 126 connected in the grid circuit of tube 116 and the common cathode resistor 120 are so chosen that the circuit does not oscillate and that tube 116 normally conducts while tube 114 is cut off. Upon receipt of a positive pulse applied from the master oscillator through an exciter tube 128, current flow is initiated in normally cut-off tube 114 and a negative pulse, corresponding to the drop produced across resistor 122, is applied through capacitor 118 to the control grid of normally conducting tube 116. Because of the coupling through common cathode resistor 120, reduction in current through tube 116 proceeds rapidly and the entire current is transferred to tube 114. Current flow continues through tube 114 until capacitor 118 is charged through resistors 126 and 124 to a sufficiently high potential to permit current flow to be reestablished through tube 116, at which time the circuit reverts to its normal condition. The values of capacitor 118 and resistors 124 and 126 are so chosen that the circuit returns to its normal condition at a time which corresponds to the mid-point on the channel period for the channel with which the modulator is associated.

Modulation of the length of the output pulse obtained from the single-shot multivibrator is effected through the application of the output from message signal amplifier 106 to the charging circuit for capacitor 118. Thus a portion of the output signal of tube 106 appearing across series resistors 126 and 130 is applied to the control grid of tube 116 through resistor 124. The charging time for capacitor 118 is accordingly advanced or retarded with a corresponding effect upon the length of the output pulse of the one shot multivibrator. The output pulses of the one shot multivibrator are applied through an output tube 132 to a pulse generator in which the length-modulated pulses are converted to position-modulated pulses for application to the radio transmitter, the time positions of the pulses from the pulse generator being dependent upon the lengths of the pulses applied thereto.

Ringing signals, when applied to input transformer 100, appear across capacitor 112 which offers a relatively high impedance at low frequencies and are applied to a rectifier 134, the direct current output of which is employed to actuate a relay 136. Armature 138 of relay 136 normally completes a connection from the output of filter 104 through contact 140 and resistor 142 to the control grid of message signal amplifier 106. Upon actuation of the relay in response to ringing currents the connection of the grid to contact 140 is transferred to contact 144. When this circuit connection is established, the output of filter 104 is removed from the grid circuit of the message signal amplifier and a bias voltage obtained from divider 146 is applied thereto. At the same time, armature 148 completes a circuit to connect a resistor 152 in parallel with resistor 130 in the anode circuit of the message signal amplifier. The net result of these changes in the connections to message signal amplifier tube 106 is to change the output voltage applied through resistor 124 to capacitor 118 of the single-shot multivibrator and to lengthen the length-modulated pulse produced by the single-shot multivibrator beyond the range of length variation that may be effected by the maximum message signal transmissible through amplifier 106. As a result, the position-modulated pulse produced by the pulse generator represents a shift in position beyond the range assigned to the message signals, and the resulting output pulses occur in the interchannel guard time.

At the receiving station, the position-modulated pulses are applied to control a single-trip multivibrator similar to that employed in the transmitter and comprising triodes 154 and 156. As in the case of the single-trip multivibrator at the transmitter, the anode of triode 154 is connected through capacitor 158 to the control grid of triode 156 while the cathodes of the two tubes are connected together and through a common cathode resistor 160 to ground. The values of the circuit components including resistor 160, capacitor 158 and grid resistor 162 of triode 156 are so adjusted that current normally flows through tube 156. In addition, these components are so chosen that the position-modulated pulses alone applied to the control grid of normally non-conductive tube 154 are insufficient to cause transfer of current from tube 156 to 154. However, a gate pulse derived from the marker pulse and coextensive with the portion of the channel period corresponding to the maximum range of position modulation is also applied to the control grid of tube 154. In the presence of both the channel and gate pulses, the control grid of tube 154 becomes sufficiently positive to cause transfer of current from tube 156 to tube 154. The time constant of the charging circuit for capacitor 158 is made large with respect to the time of the channel period with the result that current flow does not revert to normally conductive tube 156 for the remainder of the channel period. Therefore, the output of the single-shot multivibrator consists of a pulse, the length of which is dependent upon the time of occurrence of the time position-modulated pulses applied to the control grid of tube 154. These length-modulated pulses are applied through a capacitor 164 to a low-pass filter 166 the output of which is applied to an amplifier 168. The output of the low-pass filter and thus that of amplifier 168 is a reproduction of the signaling currents applied at the transmitter and may be applied through a transformer 170 to an output circuit which is normally completed through contacts 172 and 174 of a relay 176.

The output pulses from the single-shot multivibrator are also applied through a capacitor 178 to a ringing circuit. In this circuit the pulses are rectified by the shunt rectifier 180 to obtain negative pulses which are applied to charge a capacitor 182 in such polarity as to apply a negative bias to the control grid of triode tube 184. The anode circuit of triode 184 is completed through the winding of relay 176 and through the marker alarm equipment to a source of positive potential. The circuit constants of triode 184 are so adjusted that the negative bias produced across capacitor 182 by the output pulses from single-trip multivibrator 178 is of sufficient magnitude to prevent the flow of current therethrough, the time constant of the RC circuit being such as to hold the bias between successive output pulses. If, however, the output pulses from the single-shot multivibrator are interrupted the negative bias disappears and triode 184 draws anode current operating relay 176 to connect a ringing generator 186 to the output circuit. Since the single-shot multivibrator is responsive only when channel pulses and gate pulses are applied simultaneously to the control grid of triode 154 it will be recognized that whenever the time position of the channel pulse is shifted beyond the maximum signal range in response to the application of a ringing current at the transmitter station, the ringing circuit at the receiver will be actuated to transmit ringing current from generator 186 to the output circuit of the corresponding channel.

What is claimed is:

1. In a pulse modulation system, means at the transmitter for producing a series of pulses, means for modulating the relative time positions of the pulses of said series in accordance with a signal to be sent to a receiving station, means at the receiver for producing a local pulse of length equal to the maximum range of position variation produced by the modulation of pulses of said series at the transmitter, means at the receiver for producing a supervisory signal unless the time-modulated pulses from the transmitter coincide in time with said local pulses, auxiliary means at the transmitter for shifting time positions of the signal pulses to positions beyond the maximum displacement produced by signal modulation, and means for operating said auxiliary means whenever a supervisory signal is desired.

2. In a multichannel time division pulse modulation system, means at the transmitter producing a plurality of interlaced series of pulses, means for each channel for modulating the relative time positions of the pulses of one of said series in accordance with a signal to be sent over said channel, means at the receiver for producing synchronized local pulses for each channel, said local pulses being of length equal to the maximum range of position variation produced by the modulation of the signal pulses at the transmitter, means at the receiver for each channel for producing a supervisory signal unless the signal pulses in the channel coincide in time with the local pulses for that channel, and means at the transmitter for shifting the signal pulses of a channel in which a supervisory signal is desired to positions beyond the maximum displacement produced by signal modulation.

3. In a time division multiplex system in which a time period is periodically assigned to each channel and signals are transmitted as time modulations of short pulses occurring within said time periods, a plurality of input message channels, a relaxation circuit for each channel having a normal and a transient condition of stability, means for switching each relaxation circuit to the transient condition of stability at the beginning of the time period assigned to the channel with which it is associated, means responsive to the message signal in that channel for switching said relaxation circuit back to its normal condition of stability, means for applying a ringing signal to each input channel and means responsive to said ringing signal for retarding the return of said relaxation circuit to its normal condition of stability for a time greater than the maximum delay produced by said message signal.

4. In a time division multiplex system in which a time period is periodically assigned to each channel and signals are transmitted as time modulations of short pulses occurring within said time periods, a plurality of input message channels, a relaxation circuit for each channel having a normal and a transient condition of stability, means for switching each relaxation circuit to its transient condition of stability at the beginning of the time period assigned to the channel with which it is associated, means responsive to the message signal in that channel for switching said relaxation circuit back to its normal condition of stability, means for applying a ringing signal to each input channel, means responsive to said ringing signal for retarding the return of said relaxation circuit to its normal condition of stability for a time greater than the maximum delay produced by said message signal, and means at the receiving station for each channel for producing a gate pulse coincident and coextensive with the range of time variation produced in the relaxation circuits of the transmitter by said message signals, a normally operating alarm circuit and means responsive to the sum of said gate pulse and the message pulse for each channel for cutting off said alarm circuit.

5. In a pulse modulation system means for producing a series of pulses, means for modulating the relative time positions of said pulses in accordance with a message signal to be transmitted, the position modulation of each pulse being limited to an assigned modulation time separated from adjacent modulation times by guard times, an auxiliary circuit at the transmitter for shifting the time positions of the signal pulses into said guard times, means for actuating said circuits when a supervisory signal is desired, and means at the receiver for producing a supervisory signal output whenever signal pulses occur at other than the corresponding modulation times.

GERARD P. WENNEMER.

REFERENCES CITED

The following references are of record in the file of this patent:

UNITED STATES PATENTS

| Number | Name | Date |
|---|---|---|
| 2,262,838 | Deloraine | Nov. 18, 1941 |
| 2,416,330 | Labin | Feb. 25, 1947 |
| 2,432,204 | Miller | Dec. 9, 1947 |
| 2,438,902 | Deloraine | Apr. 6, 1948 |